US008737194B2

(12) United States Patent
Zhang

(10) Patent No.: US 8,737,194 B2
(45) Date of Patent: May 27, 2014

(54) OFDEM SYSTEM AND NYQUIST PULSE SHAPING METHOD WITH HIGH SPECTRUM EFFICIENCY

(75) Inventor: Junling Zhang, Shanghai (CN)

(73) Assignee: NXP, B.V., Eindhoven (NL)

( * ) Notice: Subject to any disclaimer, the term of this patent is extended or adjusted under 35 U.S.C. 154(b) by 273 days.

(21) Appl. No.: 12/991,696

(22) PCT Filed: May 1, 2009

(86) PCT No.: PCT/IB2009/051795
§ 371 (c)(1),
(2), (4) Date: Nov. 9, 2010

(87) PCT Pub. No.: WO2009/136335
PCT Pub. Date: Nov. 12, 2009

(65) Prior Publication Data
US 2011/0058471 A1 Mar. 10, 2011

Related U.S. Application Data

(60) Provisional application No. 61/051,699, filed on May 9, 2008.

(51) Int. Cl.
*H04L 27/28* (2006.01)
(52) U.S. Cl.
USPC ............................ 370/210; 370/203; 370/208
(58) Field of Classification Search
USPC .................. 370/203, 208, 210; 375/260, 340
See application file for complete search history.

(56) References Cited

U.S. PATENT DOCUMENTS

| 7,103,116 | B2* | 9/2006 | Thompson et al. ........... 375/340 |
| 7,860,057 | B2* | 12/2010 | Seki et al. ...................... 370/330 |
| 7,864,874 | B2* | 1/2011 | Hunton .......................... 375/260 |
| 2007/0133706 | A1* | 6/2007 | Chung ........................... 375/264 |
| 2007/0189406 | A1* | 8/2007 | Kim et al. ...................... 375/260 |
| 2008/0170635 | A1* | 7/2008 | Ochi et al. ..................... 375/260 |

OTHER PUBLICATIONS

Muschallik, C. "Improving an OFDM Reception Using an Adaptive Nyquist Windowing," IEEE Trans. on Consumer Electronics, vol. 42, No. 3; pp. 259-269 (Aug. 1996).
Song, R. F., et al. "A Novel OFDM Receiver with Optimum Second Order Polynomial Nyquist Windowing," J. of China Univs. of Posts and Telecomms., vol. 13, No. 2, pp. 84-89 (Jun. 2006).
International Search Report and Written Opinion for int'l. patent appln. No. PCT/IB2009/051795 (Jun. 1, 2010).
S. B. Slimane, "Performance of OFDM Systems with Time-Limited Waveforms over Multipath Radio Channels", GLOBCOM 98, vol. 2, Nov. 1998, pp. 962-967.
P. H. Moose, "A Technique for Orthogonal Frequency Division Multiplexing Frequency Offset Correction", IEEE Trans. On Communications, vol. 42, No. 10, Oct. 1994, pp. 2908-2914.

(Continued)

Primary Examiner — Andrew Chriss
Assistant Examiner — Romani Ohri

(57) ABSTRACT

A receiver system to receive an orthogonal frequency division multiplexing (OFDM) symbol of a certain spectrum efficiency. The receiver system includes a guard interval remover, a memory device, and a pulse shaper. The guard interval remover removes a guard interval from the OFDM symbol received by the receiver. The memory device stores a pulse shaping algorithm. The pulse shaper performs the pulse shaping algorithm to substantially maintain the certain spectrum efficiency in conjunction with the utilization of a Nyquist pulse shape with an excess bandwidth≤1.0.

14 Claims, 6 Drawing Sheets

(56) References Cited

OTHER PUBLICATIONS

S.H. Muller-Weinfurtner, "Optimum Nyquist Windowing in OFDM Receivers", IEEE Trans. On Communications, vol. 49, No. 3, Mar. 2001, pp. 417-420.

A. Vahlin and N. Holte, "Optimal Finite Duration Pulses for OFDM", IEEE Trans. On Communications, vol. 44, No. 1, Jan. 1996, pp. 10-14.

John G. Proakis, Digital Communications, Fourth Edition, McGraw Hill, 2000.

* cited by examiner

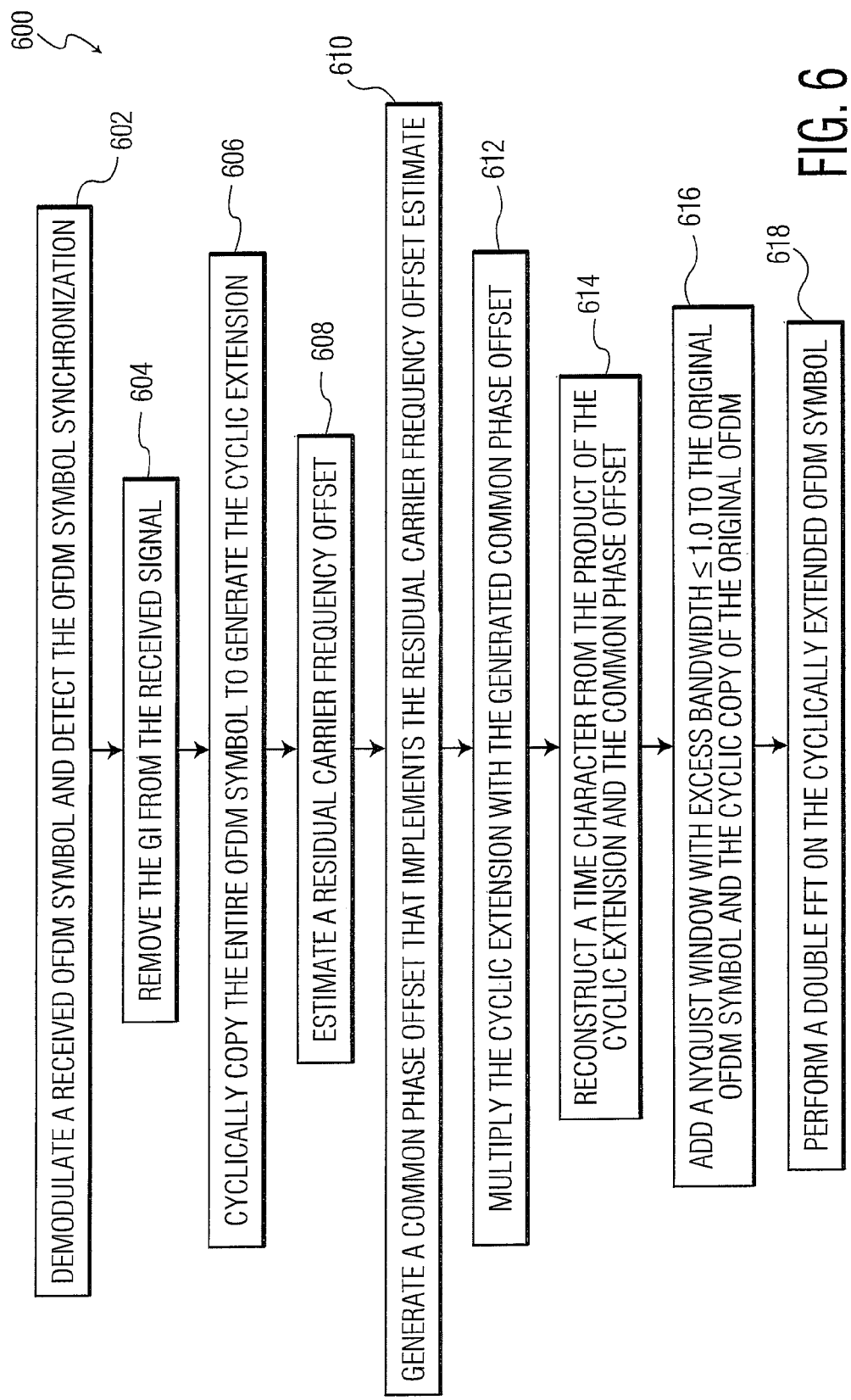

OFDEM SYSTEM AND NYQUIST PULSE SHAPING METHOD WITH HIGH SPECTRUM EFFICIENCY

Orthogonal Frequency Division Multiplexing (OFDM) is a digital multicarrier modulation scheme. OFDM uses a number of closely-spaced orthogonal sub-carriers to carry data. The sub-carriers typically overlap in frequency and may be efficiently separated using a Fast Fourier Transform (FFT) algorithm. Each sub-carrier is modulated with a conventional modulation scheme at a low symbol rate, maintaining data rates similar to conventional single-carrier modulation schemes in the same bandwidth.

For a conventional OFDM scheme, the waveform is a rectangular pulse shape. Such a waveform allows the OFDM scheme to separate the sub-carriers at a receiver when specific timing and frequency synchronizations are achievable. However, imperfections like residual frequency offset, oscillator phase noise, and Doppler spread cause InterCarrier Interference (ICI) among the sub-carriers. The ICI dramatically decreases the Signal-to-Noise Ratio (SNR) and, hence, the performance of the OFDM receiver.

To reduce the ICI, conventional waveform shaping methods such as time-limited waveform shaping methods are used to decrease side lobes of the signal spectrum, which in turn decreases the sensitivity of OFDM to frequency offsets. The spectrum of an OFDM transmission signal includes strong side lobes. This means that, in an OFDM communication, considerable spurious transmission may be radiated outside of the communication bandwidth. Typically a Nyquist time pulse is added to the received time domain signals before the FFT stage by taking advantage of the Guard Interval (GI) that is not affected by echoes. Because of the "clear" redundant signals in the GI, a Nyquist time pulse can reduce the side lobe level of the signal spectrum. In the conventional waveform shaping methods, a smoother shape, e.g., filtered by a Hanning window H(t), replaces the original rectangular window. However, the complexity of the receiver is increased by reconstructing the orthogonality among sub-carriers in the conventional waveform shaping methods.

By using a constant Nyquist window under a normalized carrier frequency offset (CFO) of 0.1 with an Excess Bandwidth (EB) of 0.266, a Carrier-to-Noise Ratio (CNR) gain of about 0.75 dB can be achieved. In general, the side lobes can be reduced more when the EB is increased. However, increasing the EB reduces the spectrum efficiency, which in turn decreases the performance of the OFDM communication system.

FIG. 1 depicts a conventional OFDM signal 100, a corresponding rectangular time window 102, and an associated coefficient spectrum 104. In the time domain, the spectrum of the OFDM signal 100 has an apparently noisy envelope, as illustrated in FIG. 1. The duration of a symbol is now increased to twice the duration (or 2N-times) in the transmitter, for example by lengthening the GI. 2N samples b1, b2, b3 . . . , b2N−1, b2N are then taken from this signal, and the samples are multiplied in accordance with FIG. 1 by a rectangular time window 102 in order to separate the individual symbols from one another. The rectangular time window 102, in this case, has a length of $2T_u$. Within this time, an FFT of length 2N calculates the 2N complex coefficients a1, a2, a3 . . . , a2N−1, a2N from the samples. These coefficients contain the information, which was modulated in the transmitter, from each individual carrier. Only the coefficients a1, a3, a5, a7 . . . , a2N−1 of the 2N coefficients contain relevant information, as is shown in the coefficient spectrum 104 of FIG. 1. The remaining coefficients are not required, so they need not be calculated.

One way to improve the frequency response of a filter bank is to prolong the duration of a useful OFDM symbol $T_u$ by doubling its length before the FFT stage using a square windowing of length $2T_u$, as shown in FIG. 1. In FIG. 1, the duration of the guard interval (GI) $T_g$ is the same as $T_u$. Then a Fast Fourier Transform (FFT) of length 2N, rather than the length N, is performed. The new formed filter bank includes 2N Dirichlet functions spaced on a half sub-carrier frequency separation so that there is an additional zero crossing between any two sub-carriers. The drawback of this type of windowing is that a long GI, i.e., Excess Bandwidth (EB)=1.0, significantly reduces spectrum efficiency. With reference to FIG. 1, when $T_g = T_u$ (i.e., EB=1.0), a double FFT of length 2N is applied as follows:

$$R(m) = \sum_{n=0}^{2N-1} r(n) \cdot e^{-j\frac{2\pi}{2N} m \cdot n} = \sum_{n=0}^{N-1} x(n) \cdot e^{j\frac{2\pi}{N} \Delta f \cdot n} \cdot e^{-j\frac{2\pi}{2N} m \cdot n} + \sum_{n=N}^{2N-1} x(n-N) \cdot e^{j\frac{2\pi}{N} \Delta f \cdot n} \cdot e^{-j\frac{2\pi}{2N} m \cdot n} \quad \text{Eq. 1}$$

where r(n) is the received signal in the time domain at the n-th time, N is the length of the original FFT, x(n) is the transmission signal with the GI, and Δf is the normalized carrier frequency offset (CFO).

FIG. 2 depicts a performance chart 200 illustrating the power-leakage associated with performing an FFT 202 of length N and performing an FFT 204 of length 2N. In particular, the power leakage from the side lobes of Eq. 1, denoting a double FFT 204 of length 2N, compared with the power leakage from the side lobes of a single FFT 202 with original length of N, are depicted in FIG. 2, with Δf=0.2 for both FFTs 202 and 204. With reference to FIG. 2, the side lobe at sub-carrier 1 using the double FFT 204 of Eq. 1 is approximately 1.8 dB lower than that using the original single FFT 202. By using a GI which is equal in length to the "useful" part of the symbol period, instead of being only one-quarter as long or less, as is generally considered, the receiver FFT is then of double the usual length and uses the samples in the GI as well as those in the useful part of the symbol period. However, up to 50% of the spectrum efficiency is lost by using a GI which is equal in length to the useful part of the symbol period, owing to the fact $T_g = T_u$ (i.e., EB=1.0).

Embodiments of a system are described. In one embodiment, the system is a receiver system to receive an orthogonal frequency division multiplexing (OFDM) symbol of a certain spectrum efficiency. Embodiments of the receiver system include a guard interval remover, a memory storage device, and a pulse shaper. The guard interval remover removes a guard interval from the OFDM symbol received by the receiver. The memory storage device stores a pulse shaping algorithm. The pulse shaper performs the pulse shaping algorithm to substantially maintain the certain spectrum efficiency in conjunction with the utilization of a Nyquist pulse shape with an excess bandwidth≤1.0. Other embodiments of the system are also described.

Embodiments of an apparatus are also described. In one embodiment, the apparatus is a pulse shaper. The pulse shaper includes means for receiving from a transmitter an OFDM symbol with a certain spectrum efficiency. The pulse shaper also includes means for a removing a guard interval from the OFDM symbol. The pulse shaper also includes means for storing a pulse shaping algorithm. The pulse shaper also includes means for performing the pulse shaping algorithm to substantially maintain the certain spectrum efficiency in conjunction with the utilization of a Nyquist pulse shape with an excess bandwidth≤1.0. Other embodiments of the apparatus are also described.

Embodiments of a method are also described. In one embodiment, the method is a Nyquist windowing method. The Nyquist windowing method includes receiving from a transmitter an OFDM symbol with a certain spectrum efficiency. The Nyquist windowing method also includes removing a guard interval from the OFDM symbol. The Nyquist windowing method also includes storing a pulse shaping algorithm. The Nyquist windowing method also includes performing the pulse shaping algorithm to substantially maintain the certain spectrum efficiency in conjunction with the utilization of a Nyquist pulse shape with an excess bandwidth≤1.0. The Nyquist windowing method also includes copying the entire OFDM symbol. The Nyquist windowing method also includes appending the entire copy of the OFDM symbol to the OFDM. The copy of the OFDM symbol and the OFDM symbol comprise a cyclically extended OFDM symbol. The Nyquist windowing method also includes estimating a residual frequency offset, $\Delta \hat{f}$. The residual frequency offset estimate includes an estimation of a normalized carrier frequency offset, $\Delta f$. The Nyquist windowing method also includes generating a common phase offset from the residual frequency offset estimate, $\Delta \hat{f}$. The common phase offset is defined by $e^{-j \cdot 2 \cdot \pi \cdot (\Delta f - \Delta \hat{f})}$. The Nyquist windowing method also includes storing the residual frequency offset and the generated common phase offset. Other embodiments of the method are also described.

Other aspects and advantages of embodiments of the present invention will become apparent from the following detailed description, taken in conjunction with the accompanying drawings, illustrated by way of example of the principles of the invention.

FIG. 6 depicts a schematic flowchart diagram of one embodiment of a pulse shaping method.

Throughout the description, similar reference numbers may be used to identify similar elements.

Figure 3:
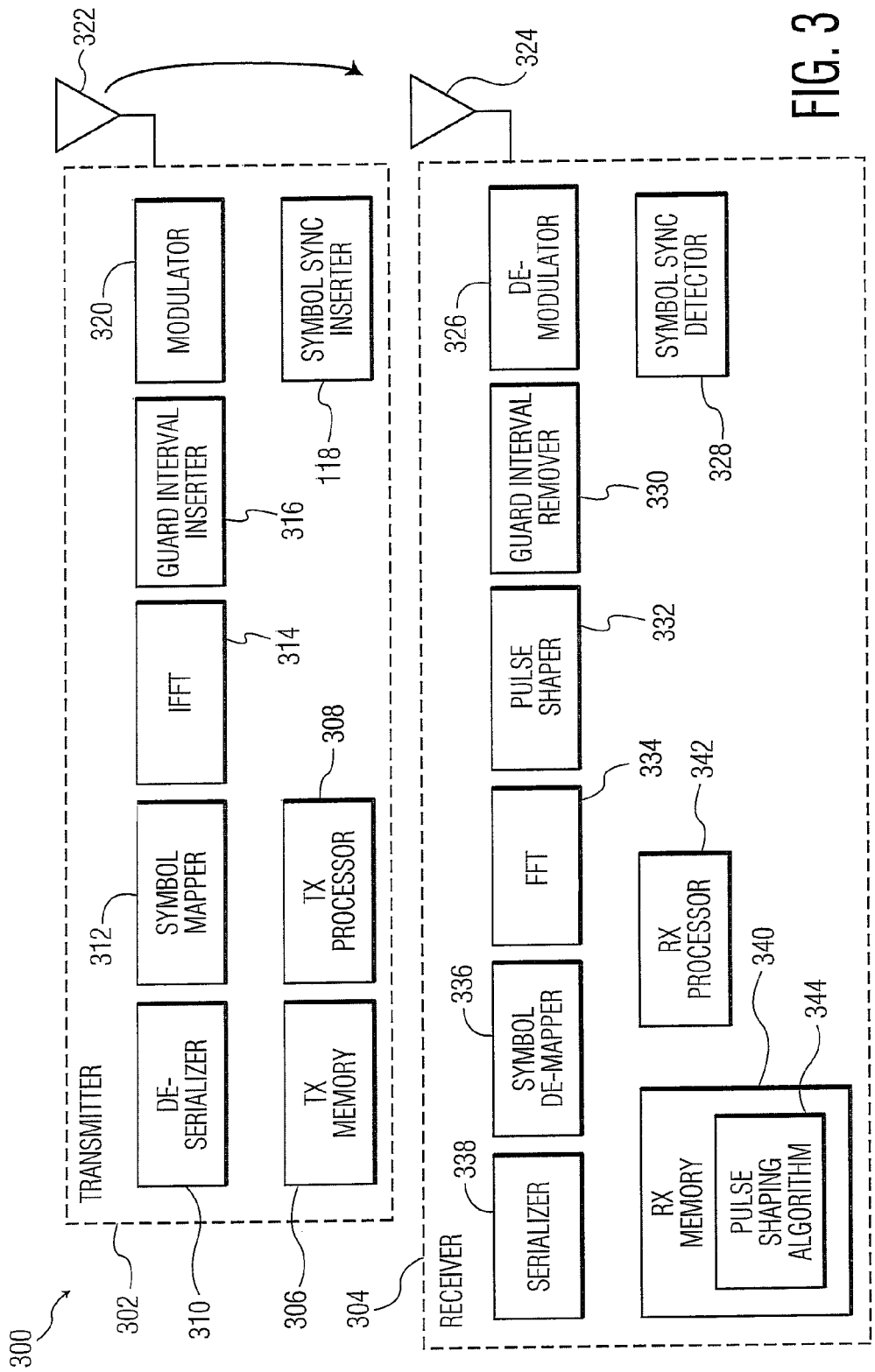
FIG. 3 depicts a schematic block diagram of one embodiment of a network communication system.

FIG. 3 depicts a schematic block diagram of one embodiment of a network communication system 300. The network communication system 300 includes a transmitter 302 and a receiver 304. In some embodiments, the transmitter 302 and the receiver 304 are components of a transceiver. Although certain component parts are shown in conjunction with the network communication system 300 of FIG. 3, other embodiments may include fewer or more component parts, or equivalent parts, to perform fewer or more pulse shaping functions. Additionally, while the components of the network communication system 300 are shown in FIG. 3 as being separate components, some of these components may be integrated. As an example, the components of the transmitter 302 and/or the components of the receiver 304 may be implemented in a single integrated circuit (IC) such as a transceiver IC. Furthermore, some of the components of the network communication system 300 such as the pulse shaper 332 may be implemented in a combination of software, hardware, and/or firmware.

As depicted in FIG. 3, the transmitter 302 includes a transmit (TX) memory device 306, a TX processor 308, a de-serializer 310, a symbol mapper 312, an Inverse Fast Fourier Transform (IFFT) unit 314, a guard interval inserter 316, a symbol sync inserter 318, a modulator 320, and at least one TX antenna 322. In general, the transmitter 302 transmits data to the receiver 304. In some embodiments, the transmitter 302 transmits OFDM packets to the receiver 304. In some embodiments, the TX memory device 306 stores data associated with the data transmitted from the transmitter 302 to the receiver 304. In some embodiments, the TX memory device 306 supplies a segment of stored data to include in a packetized transmission packet. The TX processor 308, in one embodiment, controls the operations associated with the packetizing and modulation of data and the transmission of the modulated packets of data.

In one embodiment, the de-serializer 310 receives a segment of data from the TX memory device 306. In some embodiments, the de-serializer 310 receives a serial data segment and performs a serial to parallel conversion that converts the serial data stream to parallel. In some embodiments, the de-serializer 310 sends the parallel data segments to the symbol mapper 312. In an OFDM transmission, each symbol typically transmits 40-4000 bits, although any number of bits may be used. A serial to parallel conversion stage is used to convert the input serial bit stream to the specific amount of data to be transmitted in each OFDM symbol. The data allocated to each symbol depends on the modulation scheme and the number of sub-carriers used. Exemplary OFDM modulation schemes include Binary Phase Shift Keying (BPSK), Quadrature Phase Shift Keying (QPSK), and Quadrature Amplitude Modulation (QAM). For example, for a sub-carrier modulation of 16-QAM, each sub-carrier carries 4 bits of data, and so for a transmission using 100 sub-carriers the number of bits per symbol would be 400.

In one embodiment, the symbol mapper 312 maps a symbol map pattern to each parallel data segment. In some embodiments, the symbol mapper 312 configures a Gray-coded symbol map pattern and applies the Gray-coded symbol map pattern to the parallel data segment. In an OFDM system, bits are mapped to complex (IQ) symbols which are then used to modulate a sub-carrier in the OFDM symbol. In one embodiment, the symbol mapper 312 determines the phase and amplitude of each sub-carrier and maps the phase and amplitude to a complex IQ symbol that represents the phase and amplitude. The amplitude and phase of each sub-carrier is determined based on the modulation scheme. Bits are converted into IQ symbols by mapping sets of bits onto points on the IQ plane based on an M-ary symbol map.

In one embodiment, the IFFT unit 314 performs an inverse fast Fourier transform on the mapped complex symbols to modulate a sub-carrier in the OFDM symbol. Each data point in the frequency spectrum used to perform an IFFT is called a bin. Since each bin of an IFFT corresponds to the amplitude and phase of a set of orthogonal sinusoids, the IFFT process ensures that the sub-carriers generated are orthogonal. The orthogonal sub-carriers for the OFDM signal are generated by setting the amplitude and phase of each frequency bin and then performing the IFFT. The spectrum is constructed using the calculated amplitudes and phases of the sub-carriers. The IFFT unit 314 transforms a spectrum (amplitude and phase of each component) into a time domain signal. In other words, the IFFT unit 314 converts a number of complex data points, which represent a signal in the frequency domain, into the equivalent time domain signal with the same number of points.

In one embodiment, the guard interval inserter 316 inserts a guard interval (GI) into each OFDM symbol. In other words, each OFDM symbol generated by the IFFT unit 314 is extended cyclically to minimize the effects of echoes present in the signal by providing a delay between each OFDM symbol received by the receiver 304. In some embodiment, the symbol sync inserter 318 implements a symbol synchronization function to synchronize the sub-carriers to each other. In one embodiment, the modulator 320 modulates the bit-to-symbol mapped transmission packet at the physical layer (PHY) and drives the transmitter antenna 118 with the modulated transmission packet. In some embodiments, the modulator 320 includes a radio frequency modulator and/or an IQ modulator. In some embodiments, the modulator 320 upconverts a channelized Intermediate Frequency (IF) signal and upconverts the IF signal to provide a wideband multicarrier Radio Frequency (RF) output signal. The TX antenna 322 then transmits the modulated transmission packet signal to the receiver 304. In one embodiment, the TX antenna 322 transmits the wideband multicarrier RF output signal to the receiver 304.

The receiver 304 and the transmitter 302 are complementary structures. In other words, the receiver 304 and the transmitter 302 include complementary components that perform complementary functions. As depicted in FIG. 3, the receiver 304 includes at least one receiver (RX) antenna 324, a de-modulator 326, symbol sync detector 328, a guard interval remover 330, and a pulse shaper 332. Additionally, the receiver 304 includes an FFT unit 334, a symbol de-mapper 336, a serializer 338, an RX memory device 340, and an RX processor 342. The receiver 304 sends a transmission request to the transmitter 302 when the receiver 304 receives a transmission packet from the transmitter 302 over a noisy channel.

When a transmission packet is sent across a noisy channel, segments of data in the transmission packet may be corrupted by the noise. There are numerous types of noise. One exemplary type of noise is fading. Fading refers to the distortion that a modulated signal experiences over certain propagation media. In wireless systems, fading is due to multipath propagation and is sometimes referred to as multipath induced fading. Other types of noise include frequency selectivity, interference, self interference, terrain blocking, nonlinearity, and dispersion. In some embodiments, the receiver 304 performs operations to reduce, minimize, and/or compensate for noise associated with a received transmission packet.

The RX antenna 324 receives the modulated transmission packet transmitted by the transmitter 302. In one embodiment, the RX antenna 324 receives a wideband multicarrier RF output signal and sends it to the de-modulator 326. The de-modulator 326 senses the modulated transmission packet received by the RX antenna 324 and demodulates the modulated transmission packet. In some embodiments, the de-modulator 326 receives a signal transmitted from the transmitter 302 and demodulates the signal into a baseband analog signal. In some embodiments, the de-modulator 326 includes a radio frequency de-modulator and/or an IQ de-modulator. In some embodiments, the de-modulator 326 down-converts a wideband multicarrier RF output signal to an IF signal and down-converts the IF signal to the bit-to-symbol mapped transmission packet.

Following the demodulation of the modulated transmission packet, the symbol sync detector 328 detects the symbol synchronization added to the modulated transmission packet by the symbol sync inserter 318. In other words, the symbol sync detector 328 detects the start of a symbol in order to acquire symbol synchronization. In one embodiment, the guard interval remover 330 then removes the GI inserted into each OFDM symbol by the guard interval inserter 316 using the symbol synchronization detected by the symbol sync detector 328.

In one embodiment, the pulse shaper 332 implements a modified Nyquist windowing method to utilize a Nyquist pulse shape with an excess bandwidth as large as 1.0 without losing spectrum efficiency. In some embodiments, a dedicated memory device (not shown) other than the RX memory device 340 and/or a dedicated processor (not shown) other than the RX processor 342 are embedded in the pulse shaper 332 to perform the functions and operations associated with the modified Nyquist windowing method of the pulse shaper 332. Further details of the function and operation of the pulse shaper 332 are described below with reference to FIG. 5.

In one embodiment, the FFT unit 334 performs a fast Fourier transform on a received OFDM symbol. In some embodiments, the FFT unit 334 is an orthogonal de-modulator configured to de-modulate an OFDM symbol. The FFT unit 334 performs a conversion of N serial data to parallel data with respect to the OFDM symbol and performs an FFT on the parallel data. The FFT unit 334 transforms a time domain signal into a spectrum (amplitude and phase of each component). The spectrum is reconstructed using the calculated amplitudes and phases of the sub-carriers. Thus, the FFT unit 334 generates bins that correspond to the amplitude and phase of a set of orthogonal sinusoids. In other words, the FFT unit 334 converts a number of data points, which represent a signal in the time domain, into the equivalent frequency domain signal with the same number of points.

Following the operations of the FFT unit 334, in one embodiment, the symbol de-mapper 336 de-maps the symbol map patterns respectively applied to the bit segments contained in the de-modulated transmission packet in a symbol-to-bit de-mapping process. For each bit-to-symbol symbol map pattern there is a complementary symbol-to-bit de-mapping scheme. In some embodiments, the symbol de-mapper 336 generates a parallel data segment. Following the de-mapping of the symbol map patterns, the serializer 338 receives the parallel data segment from the symbol de-mapper 336 and converts the parallel data segment into a serial data segment.

In one embodiment, the RX memory device 340 stores a pulse shaping algorithm 344. Details of the pulse shaping algorithm 344 are described in further detail below with reference to FIG. 5. In some embodiments, the RX memory device 340 stores data associated with the data transmitted from the transmitter 302 to the receiver 304. In some embodiments, the RX memory device 340 receives a serial data segment from the symbol de-mapper 336 and stores the serial data segment. The TX processor 342, in one embodiment, controls the operations associated with the reception of the modulated packets of data and the de-packetizing and de-modulation of the data.

In the case that the de-mapping and decoding are successful, i.e., the de-mapped and decoded bits are decipherable and no errors are detected, then the bits are transferred to upper layers (L2/L3) for further processing. If the data is decoded unsuccessfully, in some embodiments, the original data is stored in the RX memory device 340, and a transmission request is sent to the transmitter 302 to request that the original data be retransmitted. In some embodiments, the RX processor 342 combines the data presently received from a transmission with correlated data from a previous transmission (data already stored in the RX memory device 340) in an attempt to deduce the correct decoding of the data from the combination of the two or more sets of redundant and correlated data.

In some embodiments, the memory devices 306 and/or 340 are a random access memory (RAM) or another type of dynamic storage device. In other embodiments, the memory devices 306 and/or 340 are a read-only memory (ROM) or another type of static storage device. In other embodiments, the illustrated memory devices 306 and/or 340 are representative of both RAM and static storage memory within the network communication system 300. In some embodiments, the memory devices 306 and/or 340 are content-addressable memory (CAM). In other embodiments, the memory devices 306 and/or 340 are an electronically programmable read-only memory (EPROM) or another type of storage device. Additionally, some embodiments store instructions as firmware such as embedded foundation code, basic input/output system (BIOS) code, inter-packet symbol mapping code, and/or other similar code.

In one embodiment, the processors 308 and/or 342 are central processing units (CPU) with one or more processing cores. In some embodiments, the processors 308 and/or 342 are network processing units (NPUs) or another type of processing device such as general purpose processors, application specific processors, multi-core processors, or microprocessors. In general, the processors 308 and/or 342 execute one or more instructions to provide operational functionality to the transmitter 302 and receiver 304, respectively. The instructions may be stored locally in the processors 308 and/or 342 or in the memory devices 306 and/or 340. Alternatively, the instructions may be distributed across one or more devices such as the processors 308 and/or 342, the memory devices 306 and/or 340, or another data storage device.

Figure 4:
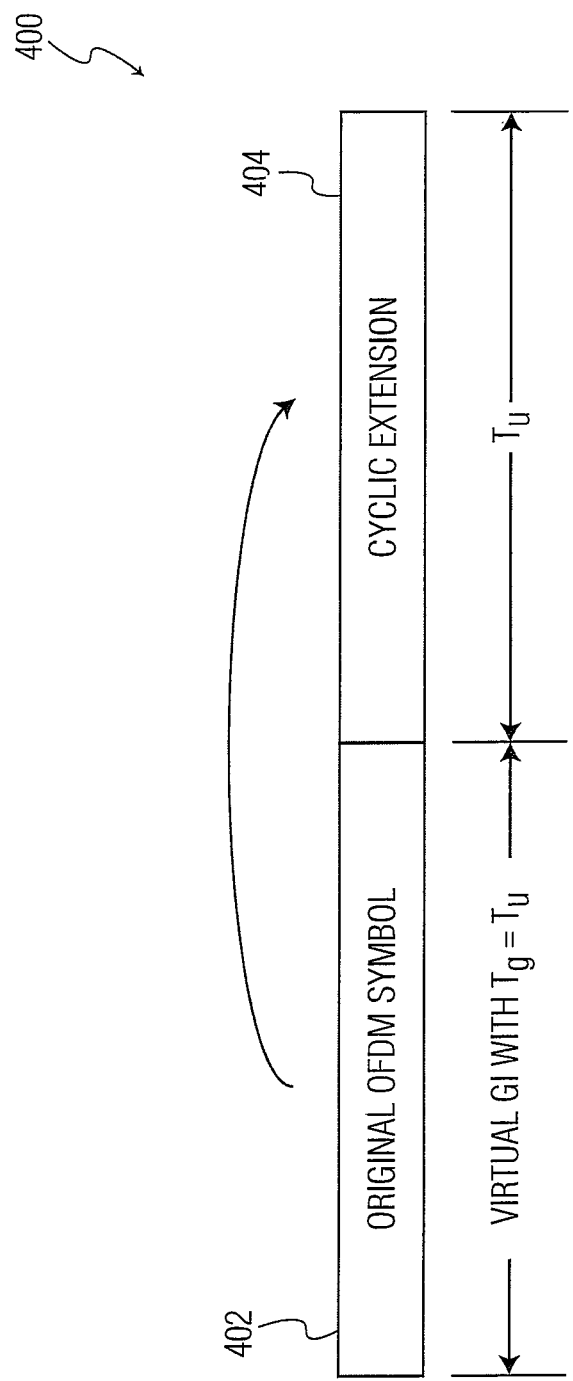
FIG. 4 depicts a schematic block diagram of a cyclically extended Orthongonal Frequency Division Multiplexing (OFDM) symbol.

FIG. 4 depicts a schematic block diagram of a cyclically extended OFDM symbol 400. The cyclically extended OFDM symbol 400 includes an OFDM symbol 402 and a cyclic extension 404 of the OFDM symbol. In one embodiment, the cyclic extension 404 is a complete copy of the entire OFDM symbol 402. In some embodiments, the cyclic extension 404 is a copy of at least a portion of the OFDM symbol 402. In some embodiments, the pulse shaper 332 cyclically copies the OFDM symbol 402 to generate the cyclic extension 404. In some embodiments, the pulse shaper 332 is configured to designate the cyclic extension 404 as a useful period, $T_u$, for OFDM de-modulation. In some embodiments, the pulse shaper 332 is configured to designate the OFDM symbol 402 as the guard interval, $T_g$.

Figure 5:
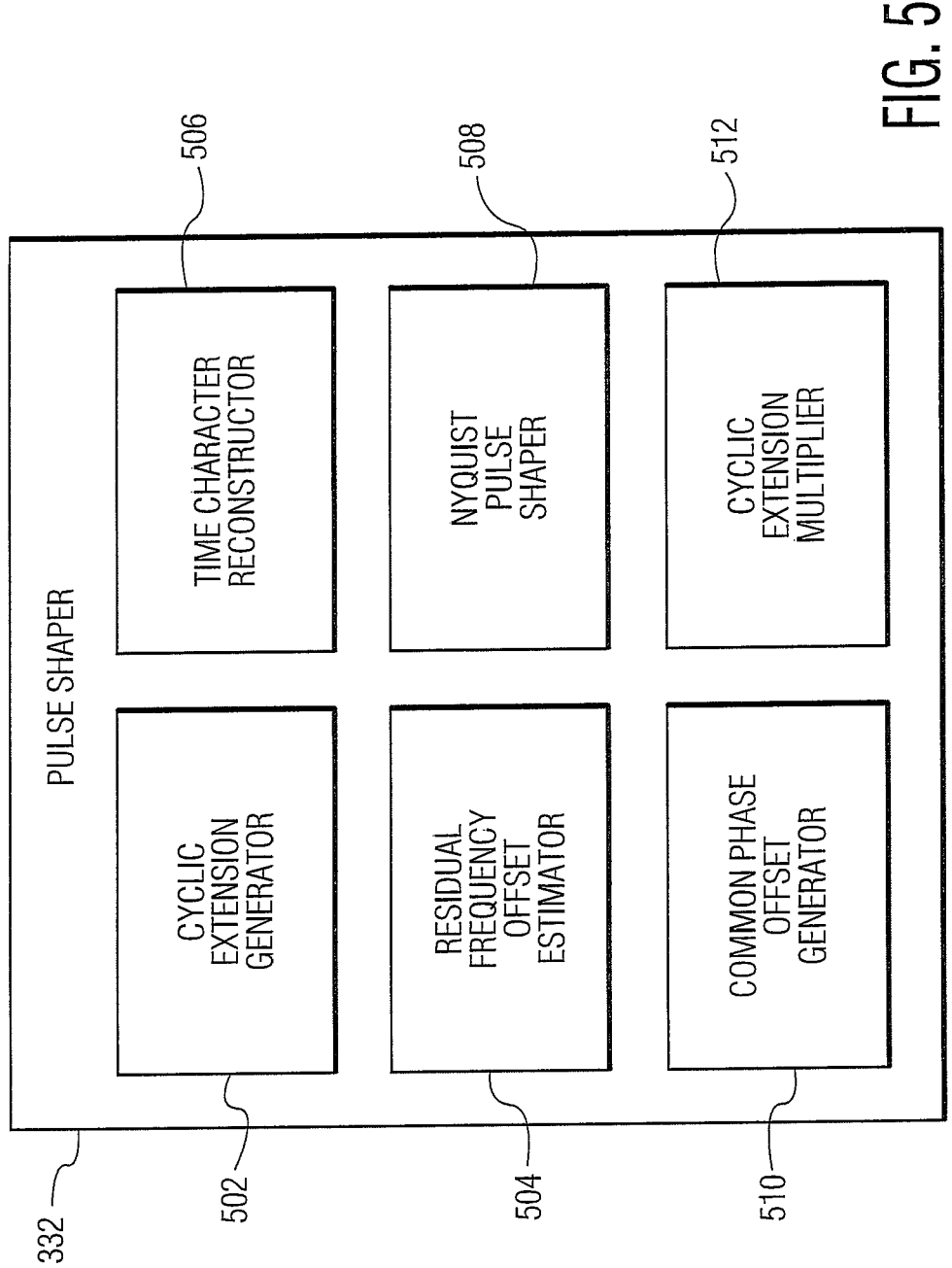
FIG. 5 depicts a schematic block diagram of one embodiment of the pulse shaper of the receiver of FIG. 3.

FIG. 5 depicts a schematic block diagram of one embodiment of the pulse shaper 332 of the receiver of FIG. 3. The pulse shaper 332 includes a cyclic extension generator 302, a residual frequency offset estimator 304, a time character reconstructor 306, and a Nyquist pulse shaper 308. Although certain component parts are shown in conjunction with the pulse shaper 332 of FIG. 5, other embodiments may include fewer or more component parts, or equivalent parts, to perform fewer or more pulse shaping functions. Additionally, while the components of the pulse shaper 332 are shown in FIG. 5 as being separate components, some of these components may be integrated. As an example, the components of the cyclic extension generator 302, the residual frequency offset estimator 304, the time character reconstructor 306, and the Nyquist pulse shaper 308 may be implemented in a single IC. Furthermore, some of the components of the pulse shaper 332, such as the cyclic extension generator and residual frequency offset estimator 304 may be implemented in a combination of software, hardware, and/or firmware. Additionally, some embodiments of the pulse shaper 332 may include similar components arranged in another manner to provide similar functionality, in one or more aspects.

In one embodiment, the cyclic extension generator 502 cyclically copies an OFDM symbol to generate a cyclic extension of the OFDM symbol. In some embodiments, the cyclic extension generator 502 is configured to designate the cyclic extension as a useful period, $T_u$, in an OFDM de-modulation process. In some embodiments, the cyclic extension generator 502 is configured to designate the OFDM symbol 402 as the guard interval, $T_g$, in the OFDM de-modulation process.

In one embodiment, the residual frequency offset estimator 504 estimates a residual frequency offset. In some embodiments, the residual frequency offset estimator 504 includes a frequency lock loop to generate a residual frequency offset estimate number. In some embodiments, the residual frequency offset estimator 504 includes an open loop offset frequency estimator based on a data burst preamble to generate a residual frequency offset estimate. In some embodiments, the residual frequency offset estimator 504 implements a maximum likelihood estimation technique to generate a residual frequency offset estimate. In some embodiments, the residual frequency offset estimator 504 obtains the residual frequency offset estimate jointly through channel estimation. In some embodiments, the residual frequency offset estimator 504 implements metric calculation values to generate the residual frequency offset estimate.

In one embodiment, the time character reconstructor 506 reconstructs a time character from Eq. 1 from the product of the cyclic extension and the generated common phase offset. In one embodiment, the Nyquist pulse shaper 508 adds a Nyquist window with Excess Bandwidth (EB)≤1.0 to the OFDM symbol and the cyclic copy of the OFDM before performing a double FFT. In other words, the Nyquist pulse shaper 508 adds a Nyquist window with EB≤1.0 to the entire cyclically extended OFDM symbol 400. Following the addition of the Nyquist window to the cyclically extended OFDM symbol 400, the FFT unit 334 performs a double FFT.

With reference to the cyclically extended OFDM symbol 400 of FIG. 4, one OFDM symbol cyclic extension is built up at the receiver 304 by a cyclic copy of the OFDM symbol such as the cyclic extension 404. Then the OFDM symbol 402 is regarded as a virtual GI and the cyclic extension 404 is regarded as the useful OFDM symbol, as illustrated in FIG. 4. A double FFT on the two OFDM symbols is applied as follows:

$$R(m) = \sum_{n=0}^{N-1} r(n) \cdot e^{-j\frac{2\pi}{2N} \cdot m \cdot n} + \sum_{n=N}^{2 \cdot N-1} r(n-N) \cdot e^{-j\frac{2\pi}{2N} \cdot m \cdot n} = $$
$$\sum_{n=0}^{N-1} x(n) \cdot e^{j\frac{2\pi}{N} \cdot \Delta f \cdot n} \cdot e^{-j\frac{2\pi}{2N} \cdot m \cdot n} + $$
$$\sum_{n=N}^{2 \cdot N-1} x(n-N) \cdot e^{j\frac{2\pi}{N} \cdot \Delta f \cdot (n-N)} \cdot e^{-j\frac{2\pi}{2N} \cdot m \cdot n}$$

Eq. 2

Comparing the second item of the second iteration of Eq. 1 with that in Eq. 2, the difference is that there is a common phase offset, $e^{-j \cdot 2 \cdot \pi \cdot (\Delta f)}$, in Eq. 2 because the second item of Eq. 2 is a cyclic copy of the first item of Eq. 2 which maintains the same phase offset caused by the normalized carrier frequency offset, $\Delta f$, as to the first item. Furthermore, a double FFT with the cyclic extension of Eq. 2 does not reduce the side lobes owing to the same phase offset occurring between the first item and the second item in the second iteration of Eq. 2.

Figure 1:
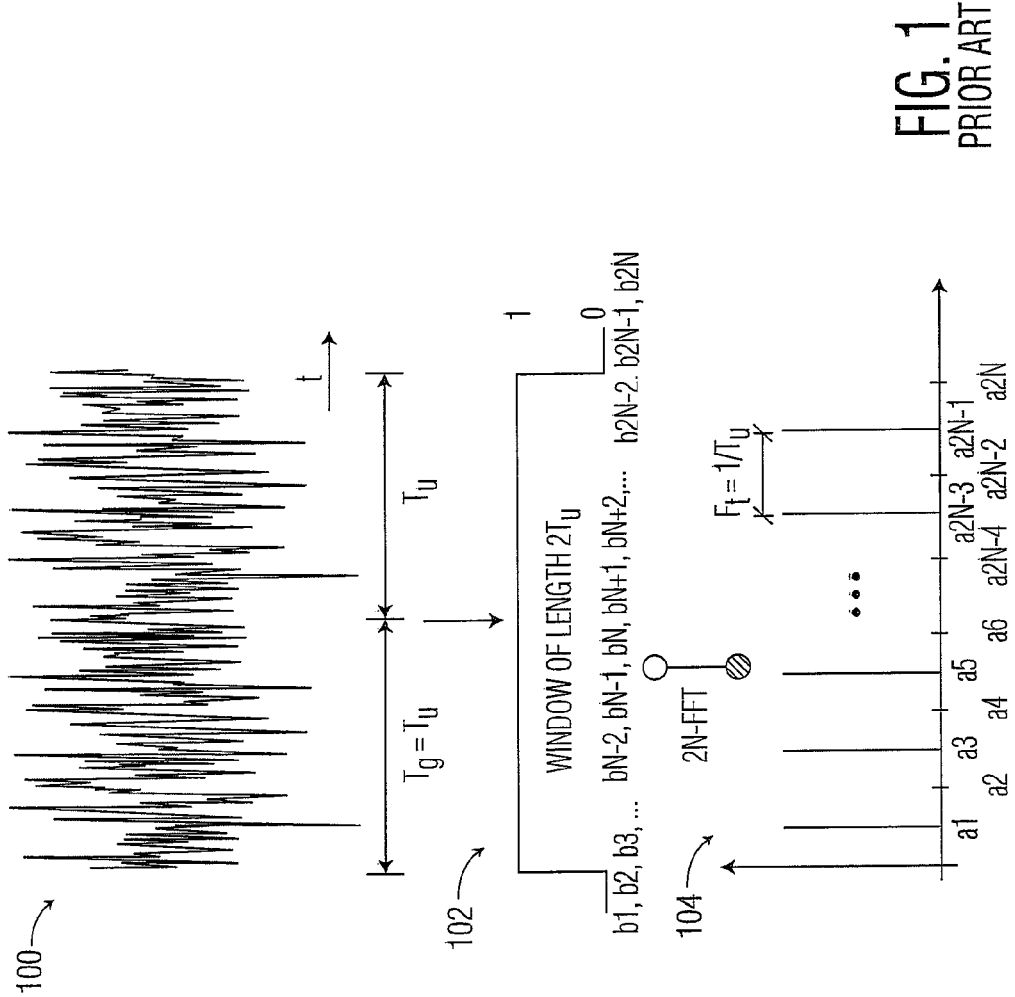
FIG. 1 depicts a conventional OFDM signal, a corresponding rectangular time window, and an associated coefficient spectrum.
Figure 2:
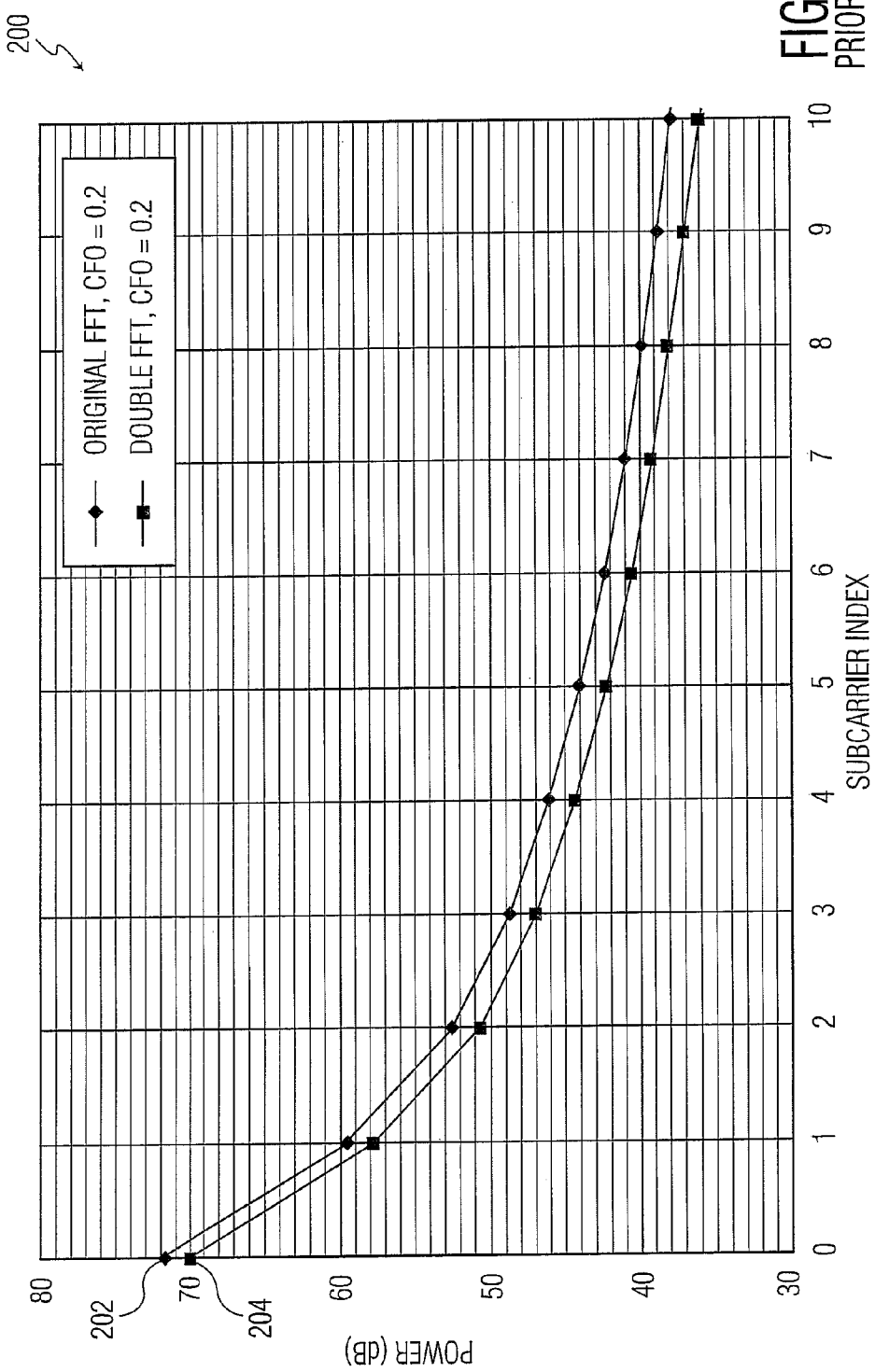
FIG. 2 depicts a performance chart illustrating the power-leakage associated with performing an FFT of length N and performing an FFT of length 2N.

Therefore, by estimating and compensating for the normalized carrier frequency offset, Δf, in the second item of Eq. 2, the double FFT on the two OFDM symbols is computed as follows:

$$R(m) = \sum_{n=0}^{N-1} r(n) \cdot e^{-j\frac{2\pi}{2 \cdot N} \cdot m \cdot n} + e^{-j \cdot 2\pi \cdot \Delta \tilde{f}} \cdot \sum_{n=N}^{2 \cdot N-1} r(n-N) \cdot e^{-j\frac{2\pi}{2 \cdot N} \cdot m \cdot n} = \quad \text{Eq. 3}$$

$$\sum_{n=0}^{N-1} x(n) \cdot e^{j\frac{2\pi}{N} \cdot \Delta f \cdot n} \cdot e^{-j\frac{2\pi}{2 \cdot N} \cdot m \cdot n} +$$

$$e^{j \cdot 2\pi \cdot (\Delta \tilde{f} - \Delta f)} \sum_{n=N}^{2 \cdot N-1} x(n-N) \cdot e^{j\frac{2\pi}{N} \cdot \Delta f \cdot n} \cdot e^{-j\frac{2\pi}{2 \cdot N} \cdot m \cdot n}$$

where $\Delta \tilde{f}$ is an estimation of the normalized carrier frequency offset, Δf. When $\Delta \tilde{f}$ = Δf, i.e., $e^{-j \cdot 2\pi \cdot (\Delta f - \Delta \tilde{f})} \cong 1$ in Eq. 3, then the effect of Eq. 3 approaches that of Eq. 1. By using a double FFT with the modified and compensated version of the cyclic extension in Eq. 3, the reduction of side lobes shown in FIG. 2 is still achieved even though EB=1.0. Thus, the double FFT with the modified cyclic extension of Eq. 3 does not cause the overhead of losing spectrum efficiency by increasing the GI up to the length of the OFDM symbol. In one embodiment, Eq. 3 is the pulse shaping algorithm 344. In some embodiments, Eq. 3 is stored in the RX memory device 340 as the pulse shaping algorithm 344. In some embodiments, the pulse shaper 332 performs the pulse shaping algorithm 344 to substantially maintain a certain spectrum efficiency of the OFDM symbol in conjunction with the utilization of a Nyquist pulse shape with an excess bandwidth≤1.0. Other embodiments may use other pulse shaping algorithms.

In some embodiments, the common phase offset generator 510 generates a common phase offset from the residual frequency offset estimate, $\Delta \tilde{f}$, where the common phase offset is defined by $e^{-j \cdot 2\pi \cdot (\Delta f - \Delta \tilde{f})}$. In some embodiments, the common phase offset generated by the common phase offset generator 510 is stored in the RX memory device 340. In some embodiments, the cyclic extension multiplier 512 multiplies the generated cyclic extension 404 of the OFDM symbol, $$\sum_{n=N}^{2 \cdot N-1} x(n-N) \cdot e^{j\frac{2\pi}{N} \cdot \Delta f \cdot n} \cdot e^{-j\frac{2\pi}{2 \cdot N} \cdot m \cdot n},$$

by the generated common phase offset, $e^{-j \cdot 2\pi \cdot (\Delta f - \Delta \tilde{f})}$. In some embodiments, the product of the cyclic extension 404 of the OFDM symbol and the common phase offset are components of the pulse shaping algorithm 344.

FIG. 6 depicts a schematic flowchart diagram of one embodiment of a pulse shaping method 600 for use with the pulse shaper 332 of FIG. 5. For ease of explanation, the pulse shaping method 600 is described in conjunction with the pulse shaper 332 of FIG. 5. However, some embodiments of the pulse shaping method 600 may be implemented with other pulse shapers. Additionally, pulse shaping method 600 is described in conjunction with the receiver 304, but some embodiments of the pulse shaping method 600 may be implemented with other receivers.

At block 602, the de-modulator 326 demodulates a received signal and the symbol sync detector 328 detects the OFDM symbol synchronization. At block 604, the guard interval remover 330 removes the GI from the received signal. At block 606, the cyclic extension generator 502 cyclically copies the entire OFDM symbol to generate a cyclically extended OFDM symbol.

At block 608, the residual frequency offset estimator 504 estimates a residual carrier frequency offset. In some embodiments, the residual frequency offset estimator 504 estimates the residual carrier frequency offset in conjunction with the RX processor 342. At block 610, the pulse shaper 332 generates a common phase offset using the residual carrier frequency offset estimate generated by the residual frequency offset estimator 504.

At block 612, the cyclic extension multiplier 512 multiplies the cyclic extension with the common phase offset generated by the pulse shaper 500. In some embodiments, the pulse shaper 332 multiplies the cyclic extension with the common phase offset in conjunction with the RX processor 342. The generated common phase offset includes the estimation of the residual carrier frequency offset.

At block 614, the time character reconstructor 506 reconstruct a time character from the product of the cyclic extension and the generated common phase offset. In some embodiments, the time character reconstructor 506 reconstructs the time character from the product of the cyclic extension and the generated common phase offset in conjunction with the RX processor 342. At block 616, the Nyquist pulse shaper 308 adds a Nyquist window with excess bandwidth≤1.0 to the OFDM symbol and the cyclic copy of the OFDM. At block 618, the FFT unit 334 performs a double FFT according to Eq. 3. In one embodiment, the FFT unit 334 performs a double FFT on the cyclically extended OFDM symbol according to a residual carrier frequency offset estimate to compensate for a carrier frequency offset associated with the cyclically extended OFDM symbol.

The pulse shaping method 600 implements a modified Nyquist windowing method to utilize a Nyquist pulse shape with an Excess Bandwidth (EB) as large as 1.0 at an OFDM receiver without losing spectrum efficiency. Additionally, utilizing a Nyquist pulse shape with an EB up to 1.0 in conjunction with the pulse shaping method 600 leads to an improvement, in some embodiments, in the signal-to-noise ratio by up to 3 dB without losing spectrum efficiency. Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A receiver system to receive an orthogonal frequency division multiplexing (OFDM) symbol of a certain spectrum efficiency, the receiver system comprising:
   a guard interval remover to remove a guard interval from the OFDM symbol received by the receiver;
   a memory device coupled to the guard interval remover, the memory device to store a pulse shaping algorithm; and
   a pulse shaper coupled to the guard interval remover, the pulse shaper to perform the pulse shaping algorithm to substantially maintain the certain spectrum efficiency of the OFDM symbol in conjunction with the utilization of a Nyquist pulse shape with a guard interval time period that is shorter than a data symbol time period, wherein the pulse shaper comprises a cyclic extension generator, the cyclic extension generator to copy the OFDM symbol and to combine the copy of the OFDM symbol with the OFDM symbol, wherein the combination of copy of the OFDM symbol with the OFDM symbol comprises a cyclically extended OFDM symbol, wherein the pulse shaper further comprises a residual frequency offset estimator coupled to the cyclic extension generator, the residual frequency offset estimator to estimate a residual frequency offset, $\Delta \tilde{f}$, and to store the estimated residual frequency offset in the memory device, wherein the estimated residual frequency offset comprises an estimation of a normalized carrier frequency offset, $\Delta f$, wherein the pulse shaper further comprises a common phase offset generator coupled to the residual frequency offset estimator, the common phase offset generator to generate a common phase offset from the residual frequency offset estimate, $\Delta \tilde{f}$, and to store the generated common phase offset in the memory device, wherein the pulse shaping algorithm comprises the generated common phase offset, and wherein the common phase offset is defined by $e^{-j \cdot 2 \cdot \pi \cdot (\Delta f - \Delta \tilde{f})}$.

2. The receiver system of claim 1, wherein the pulse shaper further comprises a cyclic extension multiplier coupled to the common phase offset generator, the cyclic extension multiplier to multiply the cyclic extension of the OFDM symbol by the generated common phase offset to produce a cyclically extended OFDM symbol, wherein the cyclically extended OFDM symbol comprises a product of the generated common phase offset and the cyclic copy of the OFDM symbol.

3. The receiver system of claim 2, wherein the pulse shaper further comprises a time character reconstructor coupled to the cyclic extension generator multiplier, the time character reconstructor to reconstruct a time character associated with the cyclically extended OFDM symbol.

4. The receiver system of claim 1, wherein the pulse shaper further comprises a Nyquist pulse shaper coupled to the cyclic extension generator, the Nyquist pulse shaper to add a Nyquist window with the guard interval time period that is shorter than the data symbol time period.

5. The receiver system of claim 1, further comprising a fast Fourier transform (FFT) unit coupled to the pulse shaper, the FFT unit to perform a double FFT on the cyclically extended OFDM symbol, wherein the double FFT of the cyclically extended OFDM symbol is defined by:

$$R(m) = \sum_{n=0}^{N-1} r(n) \cdot e^{-j\frac{2\pi}{2 \cdot N} \cdot m \cdot n} + e^{-j \cdot 2 \cdot \pi \cdot \Delta \tilde{f}} \cdot \sum_{n=N}^{2 \cdot N-1} r(n-N) \cdot e^{-j\frac{2\pi}{2 \cdot N} \cdot m \cdot n} =$$

$$\sum_{n=0}^{N-1} x(n) \cdot e^{j\frac{2\pi}{N} \cdot \Delta f \cdot n} \cdot e^{-j\frac{2\pi}{2 \cdot N} \cdot m \cdot n} +$$

$$e^{j \cdot 2 \cdot \pi \cdot (\Delta f - \Delta \tilde{f})} \sum_{n=N}^{2 \cdot N-1} x(n-N) \cdot e^{j\frac{2\pi}{N} \cdot \Delta f \cdot n} \cdot e^{-j\frac{2\pi}{2 \cdot N} \cdot m \cdot n}$$

where r(n) is a received signal in the time domain at a n-th time, N is a length of the original FFT, x(n) is a transmission signal, and $\Delta f$ is a normalized carrier frequency offset (NFO).

6. A pulse shaper comprising:
   means for storing a pulse shaping algorithm;
   means for performing the pulse shaping algorithm to substantially maintain a certain spectrum efficiency of an OFDM symbol in conjunction with the utilization of a Nyquist pulse shape with a guard interval time period that is shorter than a data symbol time period;
   means for copying the OFDM symbol;
   means for combining the copy of the OFDM symbol with the OFDM symbol, wherein the combination of the copy of the OFDM symbol with the OFDM symbol comprises a cyclically extended OFDM symbol;
   means for estimating a residual frequency offset, $\Delta \tilde{f}$, wherein the estimated residual frequency offset comprises an estimation of a normalized carrier frequency offset, $\Delta f$,
   means for storing the residual frequency offset;
   means for generating a common phase offset from the residual frequency offset estimate, $\Delta \tilde{f}$, wherein the pulse shaping algorithm comprises the generated common phase offset, and wherein the common phase offset is defined by $e^{-j \cdot 2 \cdot \pi \cdot (\Delta f - \Delta \tilde{f})}$; and
   means for storing the generated common phase offset.

7. The pulse shaper of claim 6, further comprising:
means for multiplying the cyclic extension of the OFDM symbol by the common phase offset, $e^{-j\cdot 2\cdot\pi\cdot(\Delta f - \Delta \tilde{f})}$, to produce a cyclically extended OFDM symbol, wherein the cyclically extended OFDM symbol comprises a product of the generated common phase offset and the cyclic copy of the OFDM symbol;
means for storing the products of the cyclic extension of the OFDM symbol and the common phase offset.

8. The pulse shaper of claim 6, further comprising means for reconstructing a time character of the cyclically extended OFDM symbol from the product of the common phase offset and the cyclic copy of the OFDM symbol.

9. The pulse shaper of claim 6, further comprising means for adding a Nyquist window with the guard interval time period that is shorter than the data symbol time period.

10. The pulse shaper of claim 6, further comprising means for performing the pulse shaping algorithm on the cyclically extended OFDM symbol, wherein the pulse shaping algorithm is defined by:

$$R(m) = \sum_{n=0}^{N-1} r(n)\cdot e^{-j\frac{2\pi}{2\cdot N}\cdot m\cdot n} + e^{-j\cdot 2\cdot\pi\cdot\Delta \tilde{f}}\cdot \sum_{n=N}^{2\cdot N-1} r(n-N)\cdot e^{-j\frac{2\pi}{2\cdot N}\cdot m\cdot n} =$$

$$\sum_{n=0}^{N-1} x(n)\cdot e^{j\frac{2\pi}{N}\cdot\Delta f\cdot n}\cdot e^{-j\frac{2\pi}{2\cdot N}\cdot m\cdot n} +$$

$$e^{j\cdot 2\cdot\pi\cdot(\Delta \tilde{f}-\Delta f)}\sum_{n=N}^{2\cdot N-1} x(n-N)\cdot e^{j\frac{2\pi}{N}\cdot\Delta f\cdot n}\cdot e^{-j\frac{2\pi}{2\cdot N}\cdot m\cdot n}$$

where r(n) is a received signal in the time domain at a n-th time, N is a length of the original FFT, x(n) is a transmission signal, and $\Delta f$ is a normalized carrier frequency offset (NFO).

11. A Nyquist windowing method comprising:
receiving from a transmitter an OFDM symbol with a certain spectrum efficiency;
removing a guard interval from the OFDM symbol;
storing a pulse shaping algorithm;
performing the pulse shaping algorithm to substantially maintain the certain spectrum efficiency of the OFDM symbol in conjunction with the utilization of a Nyquist pulse shape with a guard interval time period that is shorter than a data symbol time period;
copying the OFDM symbol;
combining the copy of the OFDM symbol with the OFDM symbol, wherein the combination of copy of the OFDM symbol with the OFDM symbol comprises a cyclically extended OFDM symbol;
estimating a residual frequency offset, $\Delta \tilde{f}$, wherein the estimated residual frequency offset comprises an estimation of a normalized carrier frequency offset, $\Delta f$,
generating a common phase offset coupled to the residual frequency offset estimator from the residual frequency offset estimate, $\Delta \tilde{f}$, wherein the common phase offset is defined by $e^{-j\cdot 2\cdot\pi\cdot(\Delta f - \Delta \tilde{f})}$; and
storing the residual frequency offset and the generated common phase offset.

12. The Nyquist windowing method of claim 11, further comprising:
multiplying the cyclic extension of the OFDM symbol by the common phase offset, $e^{-j\cdot 2\cdot\pi\cdot(\Delta f - \Delta \tilde{f})}$, to produce a cyclically extended OFDM symbol, wherein the cyclically extended OFDM symbol comprises a product of the generated common phase offset and the cyclic copy of the OFDM symbol;
storing the product of the cyclic extension of the OFDM symbol and the common phase offset; and
reconstructing a time character coupled to the cyclic extension multiplier of the cyclically extended OFDM symbol from the product of the common phase offset and the cyclic copy of the OFDM symbol.

13. The Nyquist windowing method of claim 11, further comprising adding a Nyquist window with the guard interval time period that is shorter than the data symbol time period.

14. The Nyquist windowing method of claim 11, further comprising performing the pulse shaping algorithm on the cyclically extended OFDM symbol, wherein the pulse shaping algorithm is defined by:

$$R(m) = \sum_{n=0}^{N-1} r(n)\cdot e^{-j\frac{2\pi}{2\cdot N}\cdot m\cdot n} + e^{-j\cdot 2\cdot\pi\cdot\Delta \tilde{f}}\cdot \sum_{n=N}^{2\cdot N-1} r(n-N)\cdot e^{-j\frac{2\pi}{2\cdot N}\cdot m\cdot n} =$$

$$\sum_{n=0}^{N-1} x(n)\cdot e^{j\frac{2\pi}{N}\cdot\Delta f\cdot n}\cdot e^{-j\frac{2\pi}{2\cdot N}\cdot m\cdot n} +$$

$$e^{j\cdot 2\cdot\pi\cdot(\Delta \tilde{f}-\Delta f)}\sum_{n=N}^{2\cdot N-1} x(n-N)\cdot e^{j\frac{2\pi}{N}\cdot\Delta f\cdot n}\cdot e^{-j\frac{2\pi}{2\cdot N}\cdot m\cdot n}$$

where r(n) is a received signal in the time domain at a n-th time, N is a length of the original FFT, x(n) is a transmission signal, and $\Delta f$ is a normalized carrier frequency offset (NFO).

* * * * *